(12) United States Patent  (10) Patent No.: US 7,717,018 B2
Kato et al.  (45) Date of Patent: May 18, 2010

(54) MACHINING UNIT AND MACHINE TOOL (75) Inventors: Heizaburo Kato, Kikugawa (JP); Minoru Kitayama, Niwa-gun (JP); Kazuya Horibe, Niwa-gun (JP); Hidekazu Kojima, Niwa-gun (JP); Masaharu Nakatsu, Niwa-gun (JP)

(73) Assignees: Sankyo Seisakusho Co., Ltd. (JP); Yamazaki Mazak Corp. (JP)

( * ) Notice: Subject to any disclaimer, the term of this patent is extended or adjusted under 35 U.S.C. 154(b) by 0 days.

(21) Appl. No.: 12/372,160

(22) Filed: Feb. 17, 2009

(65) Prior Publication Data

US 2009/0214313 A1    Aug. 27, 2009

(30) Foreign Application Priority Data

Feb. 18, 2008  (JP) .............................. 2008-036284

(51) Int. Cl.
*B23C 3/00* (2006.01)
*B23C 1/12* (2006.01)

(52) U.S. Cl. .................................... 82/79; 82/88; 279/6

(58) Field of Classification Search ................... 82/1.2, 82/1.3, 61, 70.1, 70.2, 72, 79, 88, 113; 408/150, 408/131; 279/6
See application file for complete search history.

(56) References Cited

U.S. PATENT DOCUMENTS 2,929,300 A *  3/1960 Zwick ........................ 409/191
4,400,859 A *  8/1983 Woythal et al. ............. 29/27 C
4,602,539 A     7/1986 Tsukiji et al.
5,295,410 A *  3/1994 Schow ....................... 74/571.11
5,820,536 A * 10/1998 Sato ............................ 483/38

FOREIGN PATENT DOCUMENTS

| GB | 2130937 A | 6/1984 |
| JP | 59-047108 A | 3/1984 |
| JP | 62-42726 B | 9/1987 |
| JP | 64-52604 U | 3/1989 |
| JP | 05-305501 A | 11/1993 |
| JP | 08-001413 A | 1/1996 |
| JP | 2002-370103 A | 12/2002 |

* cited by examiner

*Primary Examiner*—Will Fridie, Jr.
(74) *Attorney, Agent, or Firm*—McDermott Will & Emery LLC (57) ABSTRACT

A machining unit that is supported on a machine tool and machines a workpiece by a revolving tool with a main spindle section being driven and rotated includes an eccentric rotational section, a tool holder, a tool revolution-radius changing mechanism, and a cutting-edge-orientation correcting mechanism. The eccentric rotational section is disposed on the main spindle section, and is rotatable about an eccentric axis that is located eccentrically at any distance in a radial direction of the main spindle section from a rotation center of the main spindle section. The tool holder is disposed on the eccentric rotational section, and supports the tool. The tool revolution-radius changing mechanism moves the tool in the radial direction, and changes the radius of the revolution of the tool by rotating the eccentric rotational section about the eccentric axis. The cutting-edge-orientation correcting mechanism corrects the orientation of a cutting edge of the tool by making the tool holder spin about an axis of the tool holder, the axis being parallel to the rotation center of the main spindle section.

7 Claims, 11 Drawing Sheets

MACHINING UNIT AND MACHINE TOOL

CROSS-REFERENCE TO RELATED APPLICATIONS

The present application claims priority upon Japanese Patent Application No. 2008-36284 filed on Feb. 18, 2008, which is herein incorporated by reference.

BACKGROUND

1. Technical Field

The present invention relates to a machining unit and a machine tool that machine a workpiece by a revolving tool with a main spindle section being driven and rotated.

2. Related Art

Conventionally, for machining workpieces, a machine tool that is suitable for a type of the machining has been used. For example, when an outer circumferential surface of a cylindrical pipe is to be threaded, a lathe is used. The threading is performed in this lathe as follows: the pipe rotates about its axis in an integrated manner with a main spindle section of the lathe while the pipe being fastened by a chuck onto the main spindle section, and a tool moves straight in the axis direction of the pipe with a cutting edge of the tool abutting against the outer circumferential surface of the pipe.

However, in the case of a pipe whose diameter or length is large, more power is needed to rotate the pipe and a large lathe is needed; this results in the increase of costs. Besides, if the size of a pipe is large, the self-excited vibration is likely to occur as the pipe rotates, and this makes it difficult to maintain the machining accuracy.

As a method for solving these problems, there is a method referred to as U-axis machining, in which a machining center is used. The U-axis machining is a method in which, unlike lathes, a workpiece is immovably fastened and machined by revolving a tool while adjusting the radius of the revolution of the tool.

Figure 1A:
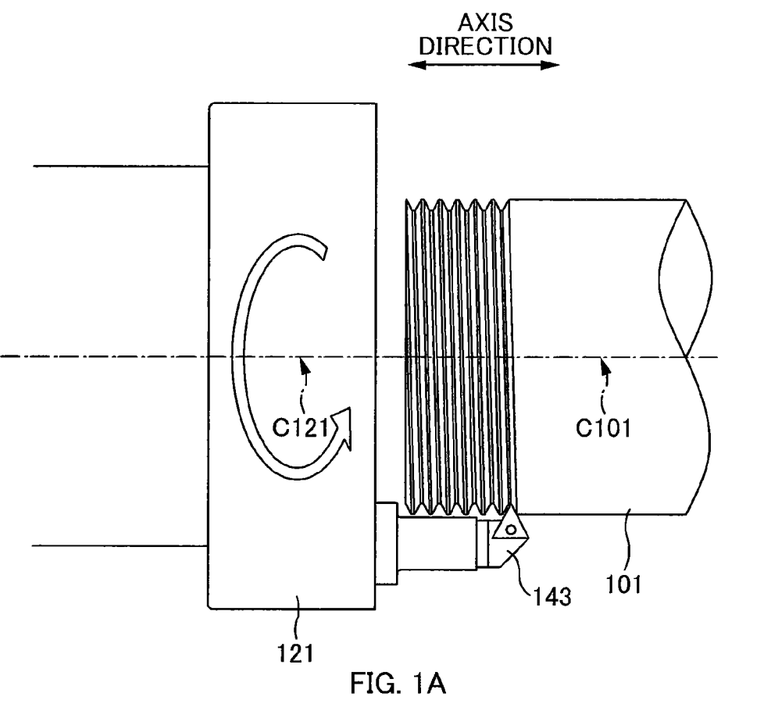
FIGS. 1A and 1B are side views of a machine tool for U-axis machining.
Figure 1B:
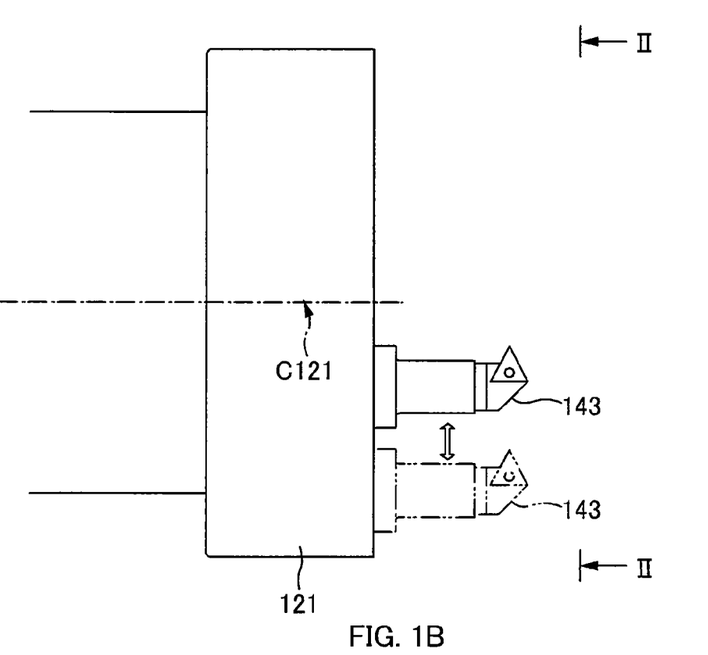

That is, as shown in the side views of FIGS. 1A and 1B, a pipe 101 is fastened immovably at a certain position. A machining center includes a main spindle section 121 that is driven and rotates, and the main spindle section 121 is provided with a tool 143 whose position is adjustable radially with respect to a rotation center C121. After adjusting the revolution radius of the tool 143 in such a manner as the tool 143 is located at a position corresponding to the diameter of the pipe 101 as shown in FIG. 1B, the main spindle section 121 rotates with the rotation center C121 of the main spindle section 121 being aligned with an axis C101 of the pipe 101, as shown in FIG. 1A. Thereby, a cutting edge of the tool 143 revolves along an outer circumferential surface of the pipe 101 and, in conjunction therewith, the main spindle section 121 moves in the axis direction of the pipe 101, so that helical threads are formed on the outer circumferential surface of the pipe 101.

Figure 2A:
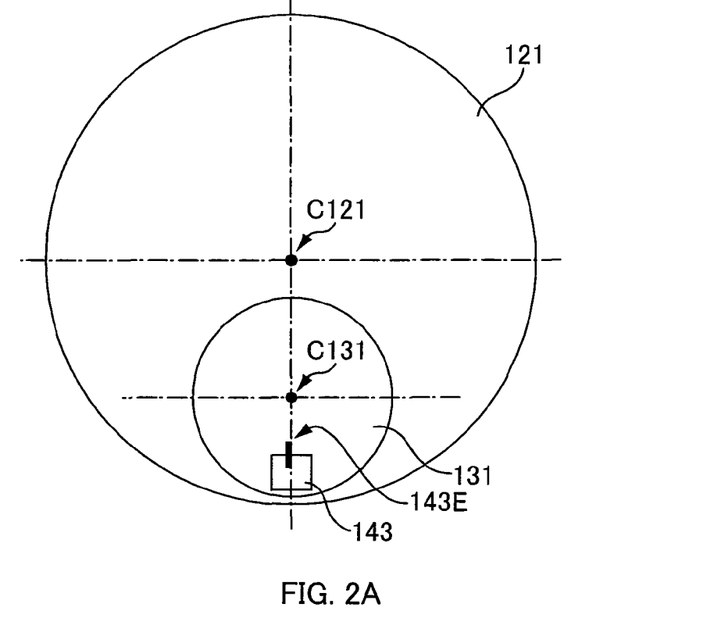
FIGS. 2A and 2B are views of FIG. 1B along arrows II for illustrating a conventional machine tool for U-axis machining.
Figure 2B:
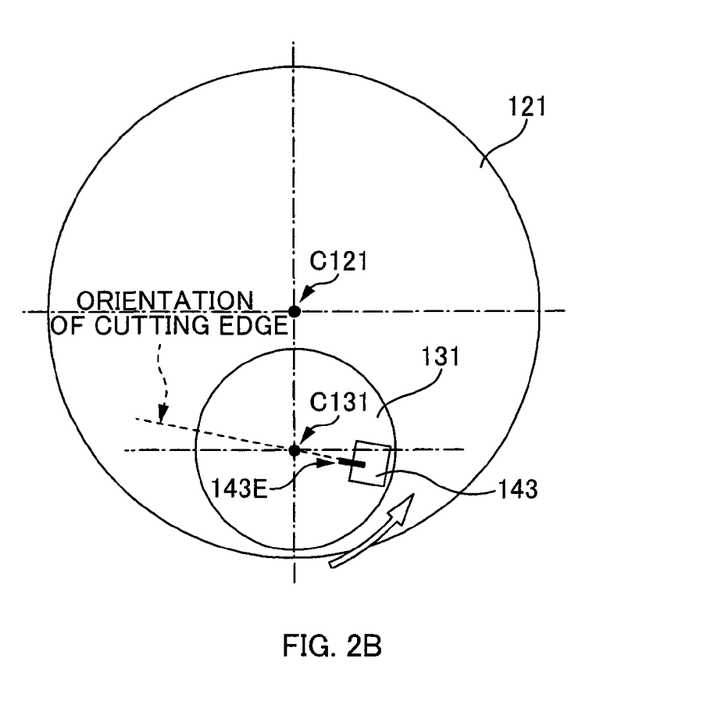

As a disclosed art relating to this type of U-axis machining, there is an apparatus disclosed in Japanese Examined Patent Publication No. 62-42726, for example. That is, as shown in FIGS. 2A and 2B, which are views of FIG. 1B along arrows II, the main spindle section 121 of the apparatus is provided with an eccentric rotational section 131 to rotate about an eccentric axis C131 that is located eccentrically in the radial direction from the rotation center C121; the tool 143 is fastened to the eccentric rotational section 131. Therefore, by rotating the eccentric rotational section 131 from a state shown in FIG. 2A to a state shown in FIG. 2B, the tool 143 moves in the radial direction of the main spindle section 121; as a result thereof, it is possible to set the revolution radius of the tool 143 to a radius corresponding to the diameter of the pipe.

In terms of the cutting capability during machining, it is desirable to turn a cutting edge 143E of the tool 143 toward the rotation center C121 of the main spindle section 121. However, in the above-mentioned apparatus, since the tool 143 is fastened on the eccentric rotational section 131 in such a manner as the tool 143 cannot rotate, it is impossible to adjust the orientation of the cutting edge 143E of the tool 143. Therefore, even if, as shown in FIG. 2A, the cutting edge 143E properly faces the rotation center C121 of the main spindle section 121 when the revolution radius of the tool 143 is a certain value, the cutting edge 143E does not face the rotation center C121 when changing the revolution radius, as shown in FIG. 2B. As a result thereof, in the apparatus, it is impossible to maintain a good cutting capability for various pipe diameters.

At the end of screw-threading process, the revolution radius of the tool 143 is changing continuously during screw-threading, in such a manner as the thread becomes gradually shallower. In this case, for the same reason as mentioned above, there is a risk that the deterioration of machining accuracy would be caused by the deterioration in cutting capability as a result that the orientation of the cutting edge 143E of the tool 143 turns away from the direction of the rotation center C121 of the main spindle section 121 at the end of screw-threading process.

SUMMARY

The invention has been made in view of conventional problems as described above, and an advantage thereof is to provide a machining unit and a machine tool in which the revolution radius of a tool is changeable while maintaining a good cutting capability of a tool.

The primary aspect of the invention for achieving the above advantage is, a machining unit that is supported on a machine tool and machines a workpiece by a revolving tool with a main spindle section being driven and rotated, including:

an eccentric rotational section that is disposed on the main spindle section and that is rotatable about an eccentric axis, the eccentric axis being located eccentrically at any distance in a radial direction of the main spindle section from a rotation center of the main spindle section;

a tool holder that is disposed on the eccentric rotational section and that supports the tool;

a tool revolution-radius changing mechanism that moves the tool in the radial direction and changes the radius of a revolution of the tool by rotating the eccentric rotational section about the eccentric axis; and a cutting-edge-orientation correcting mechanism that corrects the orientation of a cutting edge of the tool by making the tool holder spin about an axis of the tool holder, the axis being parallel to the rotation center of the main spindle section.

Further, a machine tool that machines a workpiece by a revolving tool with a main spindle section being driven and rotated, including:

a mechanism to move the main spindle section straight along an axial direction of a rotation center of the main spindle section;

an eccentric rotational section that is disposed on the main spindle section and is rotatable about an eccentric axis, the eccentric axis being located eccentrically at any distance in a radial direction of the main spindle section from the rotation center of the main spindle section;

a tool holder that is disposed on the eccentric rotational section and that supports the tool;

a tool revolution-radius changing mechanism that moves the tool in the radial direction and changes the radius of a revolution of the tool by rotating the eccentric rotational section about the eccentric axis; and a cutting-edge-orientation correcting mechanism that corrects the orientation of a cutting edge of the tool by making the tool holder spin about an axis of the tool holder, the axis being parallel to the rotation center of the main spindle section.

Other features of the invention will be made clear by reading the description of the present specification with reference to the accompanying drawings.

BRIEF DESCRIPTION OF THE DRAWINGS

FIGS. 4A and 4B are external views of the machining unit 11.

DESCRIPTION OF EXEMPLARY EMBODIMENTS

At least the following matters will be made clear by the description in the present specification and the accompanying drawings.

A machining unit that is supported on a machine tool and machines a workpiece by a revolving tool with a main spindle section being driven and rotated, including:

an eccentric rotational section that is disposed on the main spindle section and that is rotatable about an eccentric axis, the eccentric axis being located eccentrically at any distance in a radial direction of the main spindle section from a rotation center of the main spindle section;

a tool holder that is disposed on the eccentric rotational section and that supports the tool;

a tool revolution-radius changing mechanism that moves the tool in the radial direction and changes the radius of a revolution of the tool by rotating the eccentric rotational section about the eccentric axis; and a cutting-edge-orientation correcting mechanism that corrects the orientation of a cutting edge of the tool by making the tool holder spin about an axis of the tool holder, the axis being parallel to the rotation center of the main spindle section.

With this machining unit, since the orientation of the cutting edge of the tool can be corrected by the tool holder spinning, the cutting edge can face in an appropriate direction regardless of changing the revolution radius of the tool. As a result thereof, it is possible to change the revolution radius of the tool while maintaining a good cutting capability of the tool.

In such a machining unit, it is desirable that the cutting-edge-orientation correcting mechanism correct the orientation of the cutting edge in such a manner as the orientation of the cutting edge is within a certain range with reference to the rotation center of the main spindle section.

With this machining unit, the orientation of the cutting edge is corrected in such a manner as the orientation is within the certain range with reference to the rotation center of the main spindle section. Therefore, the cutting edge of the tool can face in an appropriate direction regardless of changing the revolution radius of the tool. As a result thereof, it is possible to change the revolution radius of the tool while maintaining a good cutting capability of the tool.

In such a machining unit, it is desirable that the orientation of the cutting edge of the tool be corrected in such a manner as the cutting edge faces the rotation center of the main spindle section or in the opposite direction thereto.

With this machining unit, the orientation of the cutting edge of the tool is corrected in such a manner as the cutting edge faces the rotation center of the main spindle section or in the opposite direction thereto. Therefore, regardless of the revolution radius of the tool, it is possible to maintain a good cutting capability of the tool.

In such a machining unit, it is desirable that the cutting-edge-orientation correcting mechanism change the orientation of the cutting edge of the tool according to the radius of the revolution of the tool.

With this machining unit, the orientation of the cutting edge of the tool is changed and corrected according to the revolution radius of the tool. Therefore, when the revolution radius of the tool is changed during machining, the cutting edge can automatically face in the most appropriate direction according to the revolution radius. Accordingly, it is possible to prevent cutting capability from deteriorating when changing the revolution radius during machining.

In such a machining unit, it is desirable that the path of the axis of the tool holder that is moved by the rotation of the eccentric rotational section pass through the rotation center of the main spindle section.

With this machining unit, if the tool holder is moved in the radial direction of the main spindle section by the rotation of the eccentric rotational section and the axis of the tool holder is aligned with the rotation center of the main spindle section, when the tool holder holds a tool such as a drill or an end mill, it is also possible to perform drilling and milling.

Further, since the revolution radius of the tool can be set to substantially zero, the lower limit of the processible diameter can be reduced.

In such a machining unit, it is desirable that the cutting-edge-orientation correcting mechanism be a cam mechanism that converts a rotational motion into a spinning motion to be transmitted to the tool holder, the rotational motion being inputted to the tool revolution-radius changing mechanism in order to rotate the eccentric rotational section about the eccentric axis.

With this machining unit, since the cutting-edge-orientation correcting mechanism is a cam mechanism, the rotational motion of the eccentric rotational section and the spinning motion of the tool holder can be linked with high accuracy.

Further, since the above-mentioned spinning motion is generated by the cam mechanism, it is possible to arbitrarily determine a relationship (ratio) between the eccentricity of the eccentric axis from the rotation center of the main spindle section and the eccentricity of the axis of the tool holder from the eccentric axis. By setting the cam curve according to the relationship, the tool holder can be made to spin so that the orientation of the cutting edge is always within a certain range with reference to the rotation center of the main spindle section, and in other words, always faces the rotation center of the main spindle section, regardless of the revolution radius of the tool. Therefore, a machining unit can be designed satisfying various requirements, and this machining unit can have an excellent flexibility in designing.

In such a machining unit, it is desirable that the machine tool have a mechanism to move the main spindle section straight along an axial direction of the rotation center of the main spindle section; and that the workpiece be a cylindrical pipe that is immovably held at a certain position; and that a helical thread be formed on any of an outer circumferential surface and an inner circumferential surface of the pipe by making the cutting edge of the tool abut against the surface of the pipe and moving the main spindle section straight with the main spindle section rotating while aligning an axis of the rotation center of the main spindle section with an axis of the pipe.

With this machining unit, it is possible to form helical threads on the outer circumferential surface or inner circumferential surface of the cylindrical pipe.

Further, a machine tool that machines a workpiece by a revolving tool with a main spindle section being driven and rotated, including:

a mechanism to move the main spindle section straight along an axial direction of a rotation center of the main spindle section;

an eccentric rotational section that is disposed on the main spindle section and is rotatable about an eccentric axis, the eccentric axis being located eccentrically at any distance in a radial direction of the main spindle section from the rotation center of the main spindle section;

a tool holder that is disposed on the eccentric rotational section and that supports the tool;

a tool revolution-radius changing mechanism that moves the tool in the radial direction and changes the radius of a revolution of the tool by rotating the eccentric rotational section about the eccentric axis; and a cutting-edge-orientation correcting mechanism that corrects the orientation of a cutting edge of the tool by making the tool holder spin about an axis of the tool holder, the axis being parallel to the rotation center of the main spindle section.

With this machine tool, since the orientation of the cutting edge of the tool can be corrected by the tool holder spinning, the cutting edge can face in an appropriate direction regardless of the revolution radius of the tool. As a result thereof, it is possible to change the revolution radius of the tool while maintaining a good cutting capability of the tool.

Machine Tool 1 According to First Embodiment

Figure 3:
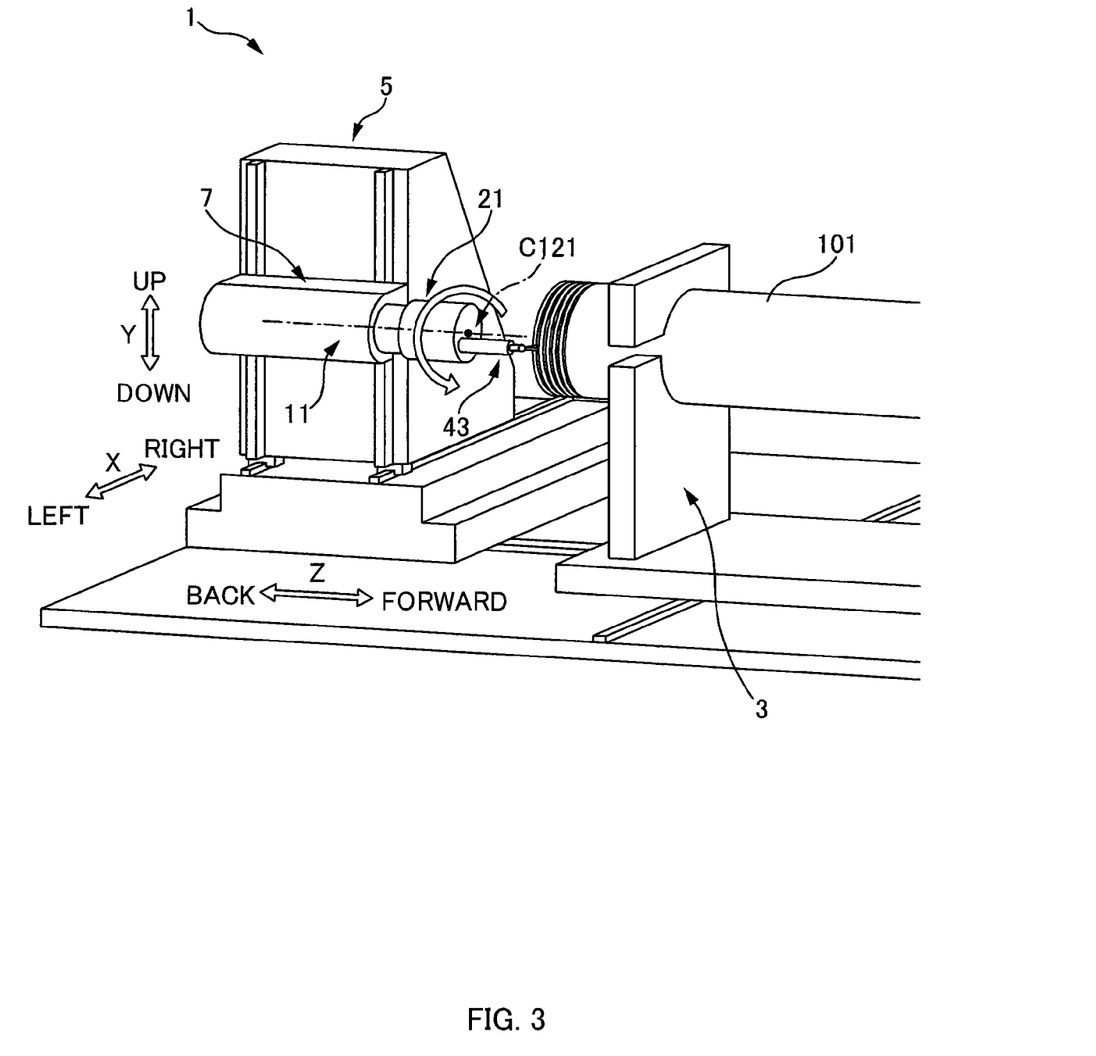
FIG. 3 is a perspective view of a machine tool 1 including a machining unit 11 according to the first embodiment.

FIG. 3 is a perspective view of a machine tool 1 including a machining unit 11 according to the first embodiment. In the following description, of three directions of XYZ axes, which are perpendicular to each other, X-axis direction is also referred to as a right-to-left direction, Y-axis direction is also referred to as a vertical direction, and Z-axis direction is also referred to as a fore-and-aft direction, as shown in FIG. 3.

When a cylindrical pipe 101, for example, is a workpiece to be processed, this machine tool 1 is for screw-threading to an outer circumferential surface or an inner circumferential surface of the pipe. Therefore, the machine tool 1 includes: a stand 3 on which the pipe 101 is placed and that holds the pipe 101 immovably; a head housing 15 that is supported by a column 5 and can move straight in Y direction, the column 5 being capable of moving straight in each of X and Z directions independently; and the machining unit 11 that is supported by the head housing 15 and causes a tool 43 to revolve along the outer circumferential surface or inner circumferential surface of the pipe 101.

On the stand 3, the pipe 101 is placed with its axis direction aligned parallel to Z-axis direction of the machine tool 1. The machining unit 11 includes a main spindle section 21 that is driven and rotated around a rotational axis C21 parallel to Z axis; this main spindle section 21 is provided with the tool 43. The head housing 15 of the column 5 moves in X and Y directions, which are the right-to-left direction and the vertical direction respectively, so that the rotational axis C21 of the main spindle section 21 is aligned with the axis of the pipe 101. Thereafter, the tool 43 is caused to revolve at a certain revolution radius by rotating the main spindle section 21 under such aligned condition, and the column 5 is moved straight in Z-axis direction with a cutting edge of the revolving tool 43 abutting against the outer or inner circumferential surface of the pipe 101. Therefore, helical threads are formed on the outer or inner circumferential surface of the pipe 101.

Figure 4A:
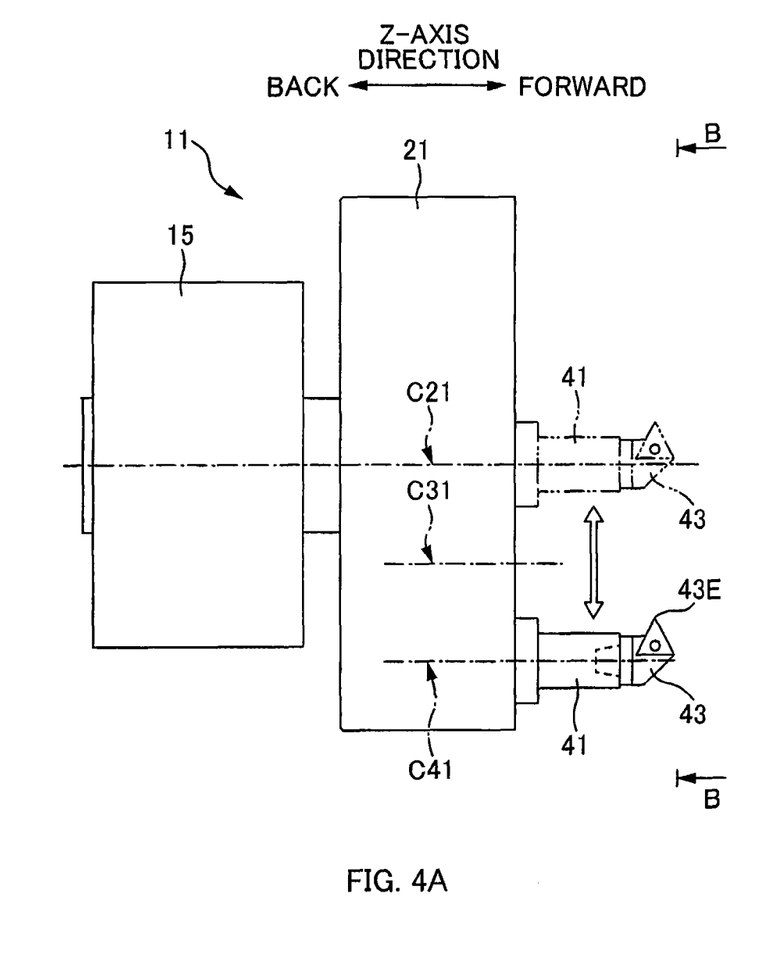
FIG. 4A is a side view.
Figure 4B:
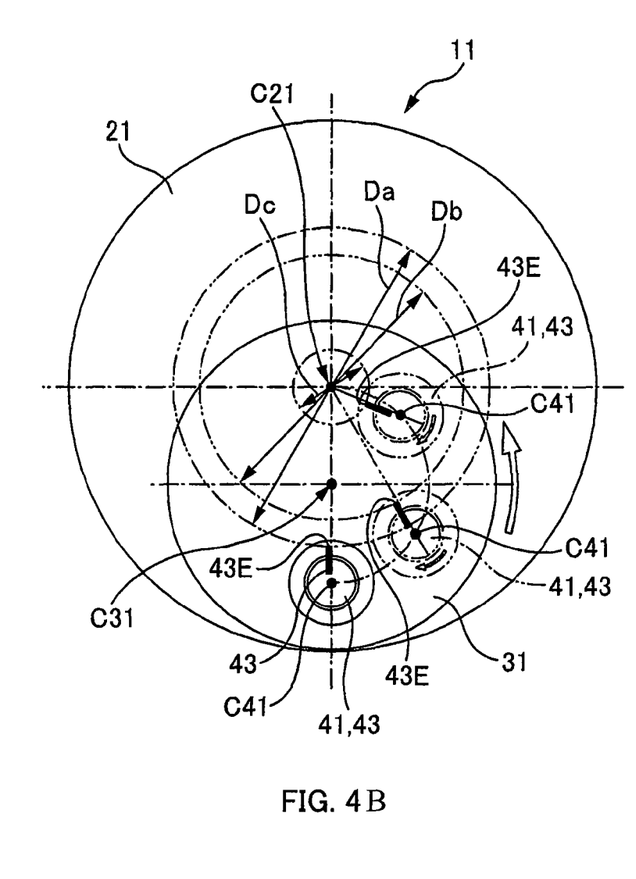
FIG. 4B is a view of FIG. 4A along arrows B.

FIGS. 4A and 4B are external views of the machining unit 11. FIG. 4A is a side view thereof, and FIG. 4B is a view of FIG. 4A along arrows B, that is, a front view.

The machining unit 11 includes: the main spindle section 21 that is rotatably supported by the head housing 15; an eccentric rotational section 31 that is disposed on the main spindle section 21 and that is rotatable about an eccentric axis C31 located eccentrically in a radial direction of the main spindle section 21 from the rotational axis C21; and a tool holder 41 that holds the tool 43 and that is disposed on the eccentric rotational section 31 in such a manner as the tool holder 41 can rotate upon itself (hereinafter referred to as "spin") about an axis C41 parallel to the rotational axis C21.

With the machining unit 11, the rotation of the eccentric rotational section 31 makes the tool 43 move in the radial direction to a position corresponding to the diameter of a pipe to be processed such as Da, Db, and Dc so that the revolution radius of the tool 43 can be set to a radius corresponding to the pipe diameter such as Da, Db, and Dc, as indicated by the dashed double dotted lines in FIG. 4B. In addition thereto, by rotating the tool holder 41 about the axis C41 (hereinafter also referred to as a spinning axis C41), a cutting edge 43E of the tool 43 can face the rotational axis C21 of the main spindle section 21. This allows a good cutting capability in screw-threading to be maintained, regardless of the pipe diameters Da, Db, Dc.

The components of the machining unit 11 are each described in detail below.

Figure 5A:
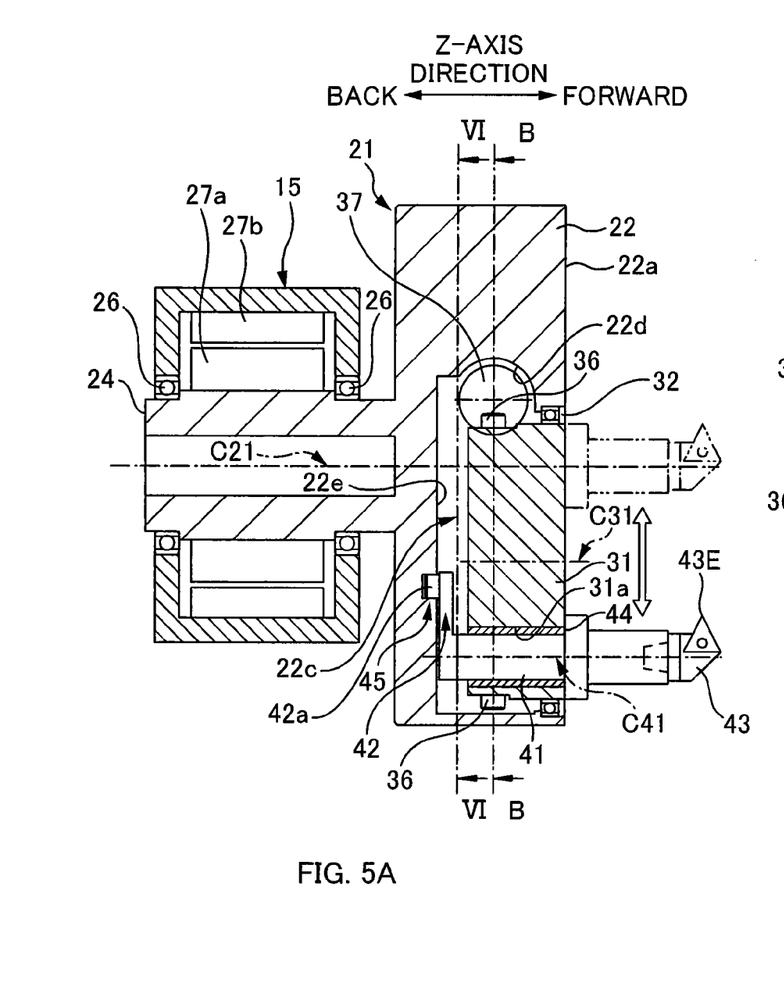
FIG. 5A is a cross-sectional view of the machining unit 11 broken out along a rotational axis C21 of a main spindle section 21.
Figure 5B:
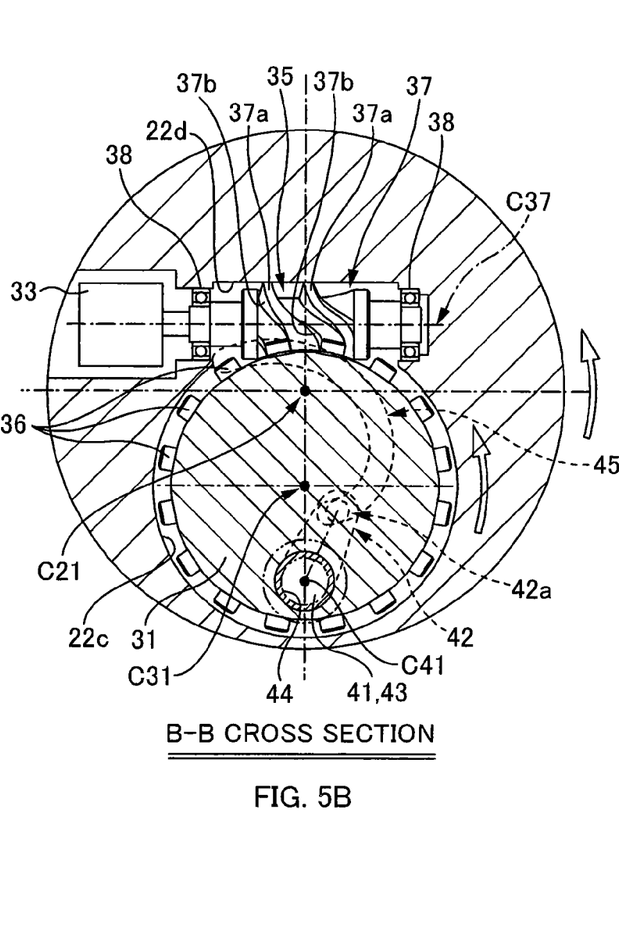
FIG. 5B is a cross-sectional view taken along line B-B in FIG. 5A.

FIG. 5A is a cross-sectional view of the machining unit 11 broken out along the rotational axis C21 of the main spindle section 21. FIG. 5B is a cross-sectional view taken along line B-B in FIG. 5A. Note that, for convenience of understanding the figures, some sections in the cut-away view are not hatched.

Main Spindle Section 21

As shown in FIG. 5A, the main body of the main spindle section 21 consists of a radially-large cylindrical section 22 located forward, and a hollow-cylinder section 24 that is radially smaller than the cylindrical section 22 and is formed extending backwards from a back end surface of the cylindrical section 22 coaxially. When the hollow-cylinder section 24 is contained in the head housing 15 of the machining unit 11, the main spindle section 21 is supported by the head housing 15 rotatably about the rotational axis C21 with bearings 26 that are provided on an inner circumference of the head housing 15.

The main spindle section 21 is rotated using an electric motor and the like as a power source; in this embodiment, the hollow-cylinder section 24 of the main spindle section 21 and the head housing 15 are used as components of the electric motor. That is, the hollow-cylinder section 24 functions as a rotor of the electric motor, and the head housing 15 functions as a stator of the electric motor. Therefore, for example, on an outer circumferential surface of the hollow-cylinder section 24, the north pole and south pole of a permanent magnet 27a are symmetrically disposed with respect to the rotational axis C21. On the other hand, on an inner circumferential surface of the head housing 15, a plurality of coils 27b that generates alternating magnetic field are arranged along the circumferential direction. Alternating currents with phase difference in the rotating direction flow in these coils 27b through a power cable. Thereby, the permanent magnets 27a of the rotor are magnetically attracted and repelled successively by each of the coils 27b of the stator and the rotor rotates in one direction, to drive and rotate the main spindle section 21 about the rotational axis C21.

Eccentric Rotational Section 31

As shown in FIGS. 5A and 5B, the main body of the eccentric rotational section 31 is a cylinder whose cross section taken perpendicular to the axis is a perfect circle, and is contained in a circular depression 22c that is formed on a front end surface 22a of the cylindrical section 22 of the main spindle section 21. The eccentric rotational section 31 is supported rotatably about a center C31 with a bearing 32 provided on an inner circumferential surface of the circular depression 22c.

The center C31 corresponds to the above-mentioned eccentric axis C31; that is, the center C31 is located eccentrically in the radial direction from the rotational axis C21 of the main spindle section 21. The tool holder 41 is located eccentrically in the radial direction from the eccentric axis C31. Therefore, when the eccentric rotational section 31 rotates about the eccentric axis C31, the tool holder 41 moves in the radial direction of the main spindle section 21. Thereby, the revolution radius of the tool 43 is changed.

A driving mechanism (corresponding to the tool revolution-radius changing mechanism) for rotating the eccentric rotational section 31 is contained in a hole section 22d that is formed in the cylindrical section 22 of the main spindle section 21 and communicates with the circular depression 22c. The driving mechanism includes a servo motor 33 serving as a power source, and a cam mechanism 35 that transfers the rotation of a driven-and-rotated shaft of the servo motor 33 to the eccentric rotational section 31.

As the cam mechanism 35, a cam mechanism using a globoidal cam is used so as to reduce backlash. More specifically, the cam mechanism 35 includes: a plurality of cam followers 36 disposed at a certain pitch along the circumferential direction on an outer circumferential surface of the eccentric rotational section 31; and a spindle-like globoidal cam 37 that faces the outer circumferential surface of the eccentric rotational section 31 is rotatably supported by bearings 38, 38 located on an inner circumferential surface of the hole section 22d. On an outer circumferential surface of the globoidal cam 37, a substantially-helical tapered rib 37a is formed that serves as a cam surface and whose position in a direction along an axis C37 shifts constantly and continuously in one direction according to a position in the circumferential direction. The orientation of the axis C37 is directed toward the rotating direction of the eccentric rotational section 31, which is the circumferential direction thereof. Therefore, the rotation is transmitted to the globoidal cam 37 from the servo motor 33 that is connected directly to a shaft end of the globoidal cam 37, and this makes the globoidal cam 37 rotate. While adjacent cam followers 36, 36 abut against both side surfaces 37b, 37b of the tapered rib 37a and keep the tapered rib 37a sandwiched therebetween, the cam followers 36 are fed successively in the direction along the axis C37 of the globoidal cam 37. Thereby, the eccentric rotational section 31 rotates about the eccentric axis C31.

Any one of a driven-and-rotated shaft 33a of the servo motor 33, the globoidal cam 37, and the eccentric rotational section 31 is provided with a rotation-amount detection sensor (not shown), such as an encoder for detecting the rotation amount (rotation angle) of the eccentric rotational section 31. A relationship between the rotation amount of the eccentric rotational section 31 and the travel of the tool holder 41 in the radial direction of the main spindle section 21 can be obtained geometrically in advance based on arrangements of the rotational axis C21 of the main spindle section 21, the eccentric axis C31 of the eccentric rotational section 31, and the tool holder 41. Accordingly, in this example, a computer to which rotation-amount information outputted from the rotation-amount detection sensor is inputted is provided as a controller. By controlling the rotation of the servo motor 33 based on the rotation-amount information, the computer moves the tool holder 41 to a target position in the radial direction and adjusts the revolution radius of the tool 43 to a target radius.

Tool Holder 41

As shown in FIGS. 5A and 5B, the main body of the tool holder 41 is a cylinder whose cross section taken perpendicular to the axis is a perfect circle; the tool 43 is attached to the front end of the cylinder. Being contained in a through hole 31a extending in the eccentric rotational section 31 in the fore-and-aft direction, the back end of the cylinder is supported to rotate about a center C41 by a bearing 44 disposed on an inner circumferential surface of the through hole 31a. The center C41 corresponds to the above-mentioned spinning axis C41, and, in other words, is parallel to the rotational axis C21 of the main spindle section 21. Accordingly, when making the tool holder 41 spin about the center C41, the orientation of the cutting edge 43E of the tool 43 can be adjusted in such a manner as the orientation is within a certain range with reference to the rotational axis C21.

In the first embodiment, the tool holder 41 is made to spin according to the revolution radius of the tool 43 that is changed by the rotational motion of the eccentric rotational section 31. Thereby, the orientation of the cutting edge 43E of the tool 43 is corrected and adjusted in such a manner as the cutting edge 43E always faces the rotational axis C21 of the main spindle section 21 during machining, regardless of the revolution radius of the tool 43.

As a mechanism that changes the orientation of the cutting edge 43E according to the revolution radius (corresponding to the cutting-edge-orientation correcting mechanism), there is, for example, a cam mechanism that converts a rotational motion of the eccentric rotational section 31 into a spinning motion of the tool holder 41 to be transmitted to the tool holder 41; in this example, a so-called grooved cam is used. More specifically, a cam groove 45 is engraved substantially in an arc-shape on a bottom surface 22e of the circular depression 22c formed on the front end surface 22a of the main spindle section 21. The cam groove 45 is formed so that a cam follower 42a at an end of an arm 42 enters into and is engaged to the cam groove 45, the arm 42 being provided in an integrated manner with the back end of the tool holder 41. As shown in FIGS. 6A to 6D, that is, the cross-sectional views taken along line VI-VI of FIG. 5A, by a rotational motion of the eccentric rotational section 31 about the eccentric axis C31, the tool holder 41 shifts in the radial direction with respect to the rotational axis C21 of the main spindle section 21 while circling the eccentric axis C31. At this time, due to the cam follower 42a moving along the cam groove 45 with its motion being restricted by the cam groove 45, a spinning motion is also applied to the tool holder 41 through the arm 42. Therefore, the orientation of the cutting edge 43E of the tool 43 of the tool holder 41 is corrected so that the cutting edge 43E always faces the rotational axis C21 of the main spindle section 21.

A substantially arc-shaped curve of the cam groove 45 (cam curve), which is for making the tool holder 41 spin by a necessary amount depending on its position when circling the eccentric axis C31 in the foregoing manner, is determined only based on a geometrical relationship between the position of the rotational axis C21 of the main spindle section 21, the position of the eccentric axis C31 of the eccentric rotational section 31, and the position of the spinning axis C41 of the tool holder 41. The arc-shaped curve is determined by an appropriate drawing method.

The arc-shaped curve of the cam groove 45 is determined so that the cutting edge 43E of the tool 43 turns toward the rotational axis C21 of the main spindle section 21 during machining. In other words, the curve is determined so that the cutting edge 43E turns toward the rotational axis C21 when being subject to an expected cutting force. Accordingly, when not machining, that is, under no load, the orientation of the cutting edge 43E turns away from the direction of the rotational axis C21 of the main spindle section 21 by an amount of elastic deformation of the tool 43, the tool holder 41, etc. based on the expected cutting force. Therefore, when presetting the orientation of the cutting edge 43E at a time machining is not performed, it is desirable to set it to face a position away from the rotational axis C21 by an amount corresponding to the foregoing elastic deformation.

In the first embodiment, since the spinning motion of the tool holder 41 is generated by the cam mechanism in the foregoing manner, it is possible to arbitrarily determine a relationship (ratio) between the eccentricity of the eccentric axis C31 from the rotational axis C21 and the eccentricity of the spinning axis C41 from the eccentric axis C31. By setting the cam curve, which is the arc-shaped curve of the cam groove 45, according to the above mentioned relationship, the tool holder 41 can be made to spin so that the cutting edge 43E of the tool 43 always faces the rotation center C21 of the main spindle section 21 regardless of the revolution radius of the tool 43. Therefore, the machining unit 11 can be designed to satisfy various requirements and the machining unit 11 can have an excellent flexibility in designing.

Incidentally, the above mentioned timing at which the revolution radius of the tool 43 is changed is not limited to the time when the pipe 101 is set before screw-threading, but can be changed online during screw-threading. Changing the radius online would allow threads with a more complex shape to be formed while maintaining high cutting capability. For example, when forming the trailing end at the end of the screw-threading process, the revolution radius of the tool 43 is made to change continuously during screw-threading in such a manner as the thread becomes gradually shallower. In this case, with the machining unit 11, the cutting edge 43E is turned toward the rotational axis C21 of the main spindle section 21 according to the changing of the revolution radius of the tool 43. Therefore, as a result, it is possible to maintain a high machining accuracy without deterioration in the cutting capability.

Figure 6A:
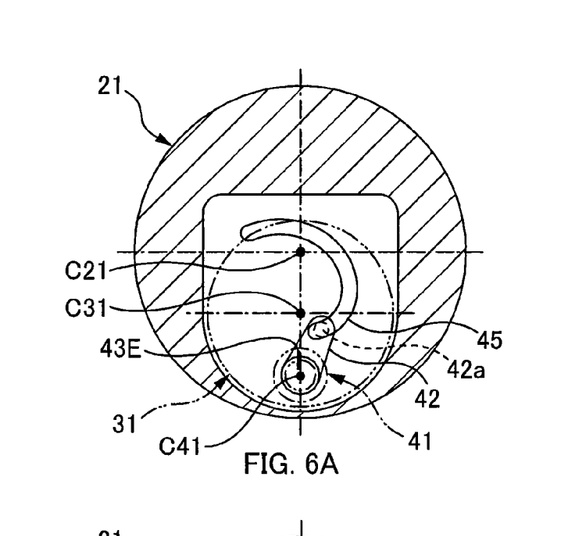
FIGS. 6A to 6D are diagrams showing cross-sectional views taken along line VI-VI in FIG. 5A, and describe how a cutting-edge-orientation correcting mechanism makes a cutting edge 43E face the rotational axis C21 of the main spindle section 21 according to the revolution radius of a tool 43.
Figure 6B:
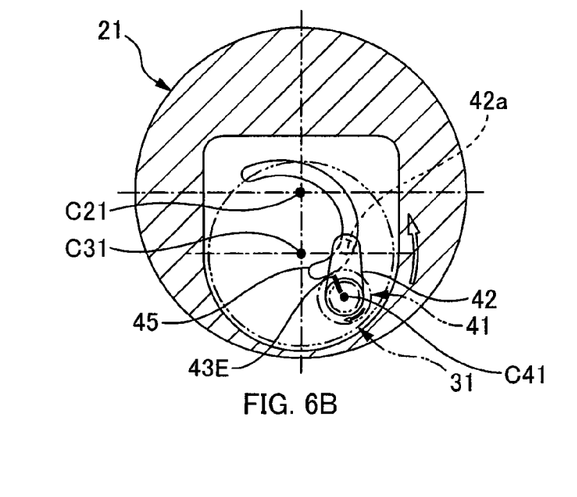
Figure 6C:
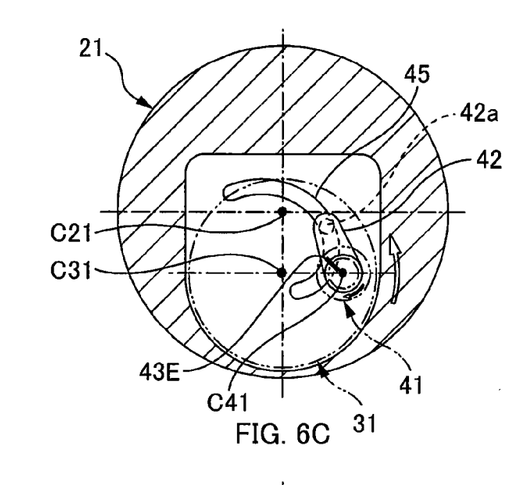
Figure 6D:
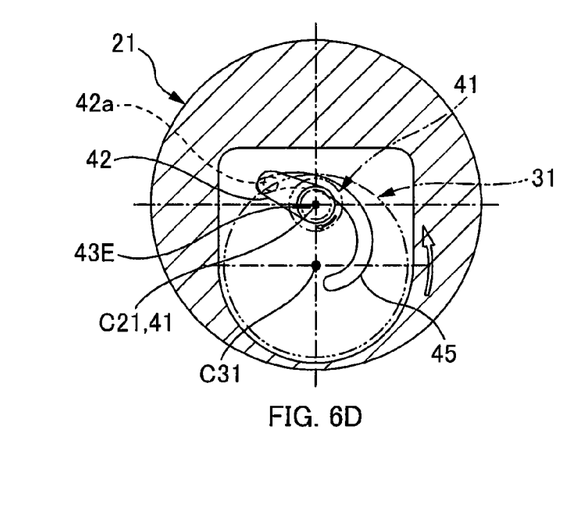
Figure 7:
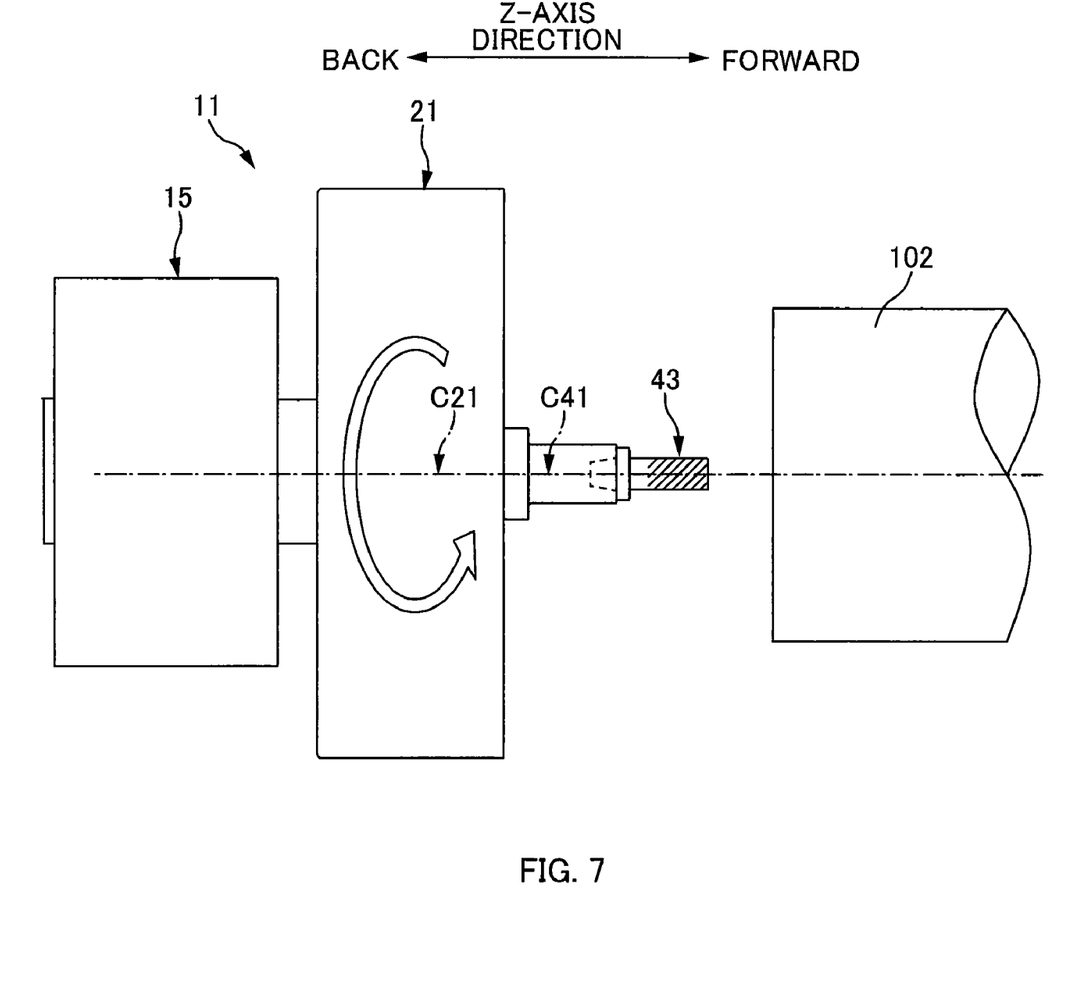
FIG. 7 is a diagram illustrating that the machining unit 11 according to the first embodiment can perform processes such as drilling and milling.

Further, the arc-shaped curve of the cam groove 45 is preferably determined (see FIG. 6D) so that the path of the spinning axis C41 of the tool holder 41 that is moved by the rotation of the eccentric rotational section 31 in the radial direction of the main spindle section 21 passes through the rotational axis C21 of the main spindle section 21. If the path is determined in this manner, it is possible to move the tool holder 41 in the radial direction of the main spindle section 21 by the rotation of the eccentric rotational section 31, to align the axis C41 of the tool holder 41 with the rotational axis C21 of the main spindle section 21 as shown in FIG. 6D. Therefore, as shown in FIG. 7, when a tool such a drill or an end mill is held as the tool 43 by the tool holder 41, it is also possible to perform drilling and milling to a workpiece 102 by the rotation of the main spindle section 21. Besides, since the revolution radius of the tool 43 can be reduced to substantially zero, the lower limit of the processible diameter of a workpiece 101 can be made small, that is, the range of the processible diameter can be extended.

Machining Unit 11a According to Second Embodiment

Figure 8:
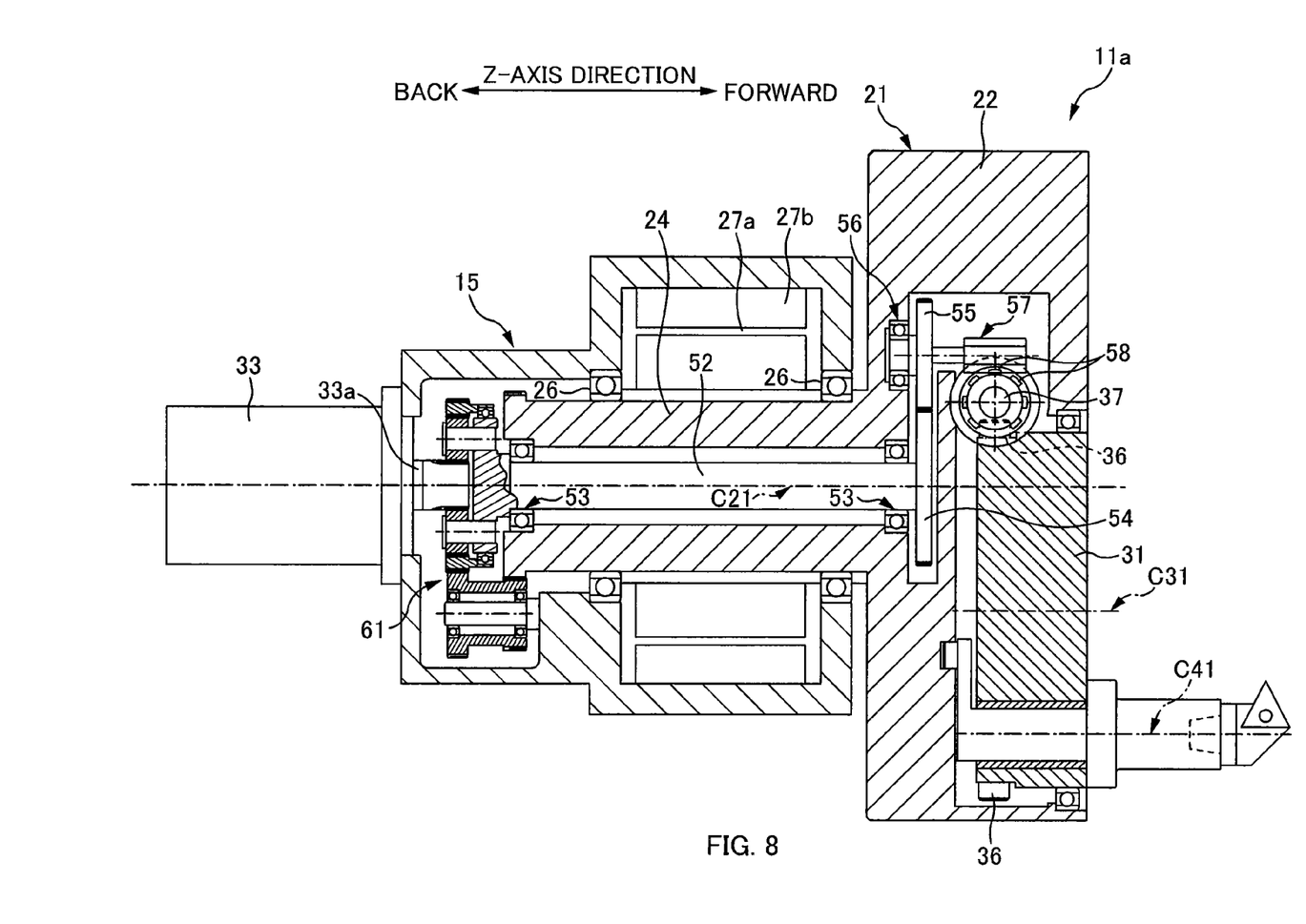
FIG. 8 is a diagram describing a machining unit 11a according to the second embodiment, and shows a longitudinal cut-away view of the machining unit 11a cut along the rotational axis C21 of the main spindle section 21.
Figure 9A:
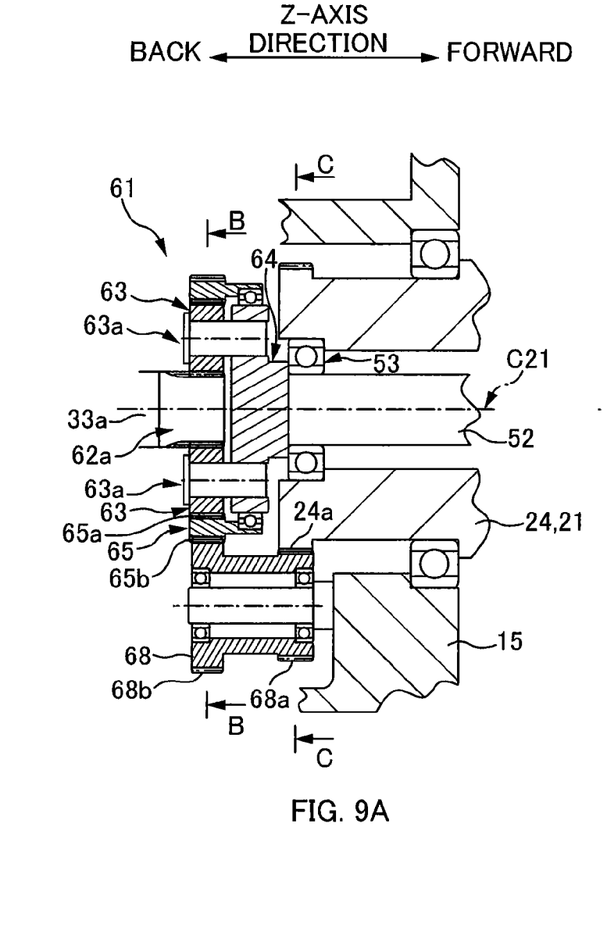
FIGS. 9A to 9C are diagrams for describing a differential gear mechanism 61 for rotating an eccentric rotational section 31.
Figure 9B:
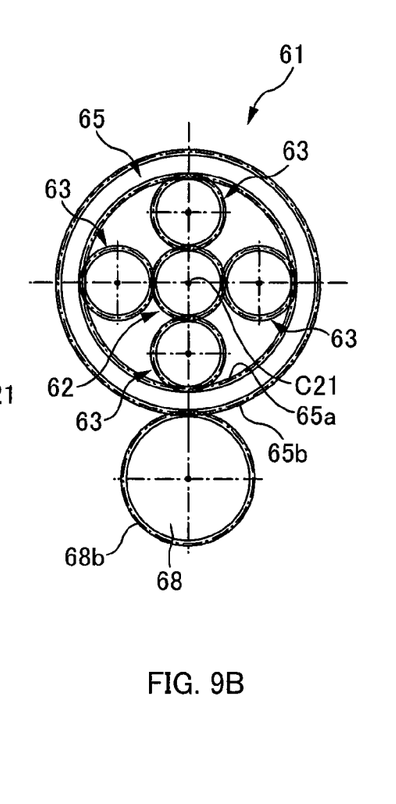
Figure 9C:
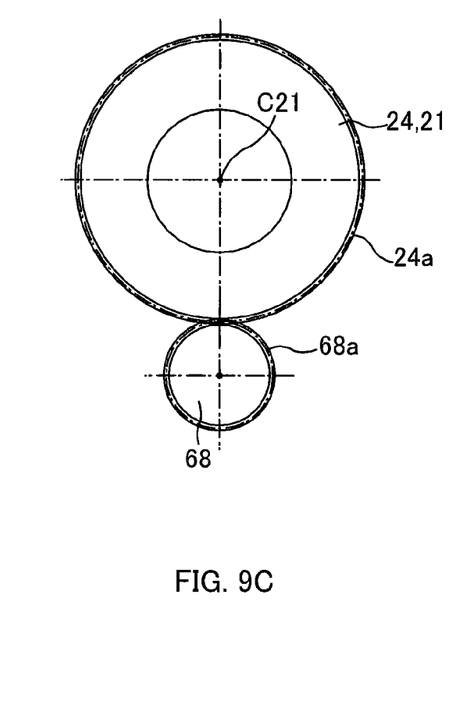

FIGS. 8 to 9C are diagrams for illustrating a machining unit 11a according to the second embodiment. FIG. 8 is a longitudinal cut-away view of the machining unit 11a cut along the rotational axis C21 of the main spindle section 21. FIG. 9A is an enlarged cross-sectional view of a differential gear mechanism 61 for rotating the eccentric rotational section 31. FIG. 9B is a schematic sectional diagram showing a meshing relationship between a sun gear 62, planetary gears 63, and an outer gear 65, taken along line B-B of FIG. 9A. FIG. 9C is a schematic sectional diagram showing a meshing relationship between outer teeth 24a of the main spindle section 21 and teeth 68a of a gear 68, taken along line C-C of FIG. 9A. Note that, for the convenience of understanding the figures, some sections in the cut-away view are not hatched.

In the above-mentioned first embodiment, a configuration in which the servo motor 33 for driving and rotating the eccentric rotational section 31 was included in the main spindle section 21 that rotates was exemplified (see FIG. 5B). If the motor 33 is included in the main spindle section 21 as in the foregoing manner, the motor 33 revolves and moves about the rotational axis C21 together with the rotation of the main spindle section 21. As methods for supplying electricity to the motor 33, which revolves and moves in this manner, there is a method where the main spindle section 21 has built-in batteries close to the motor 33, and a method where electricity is supplied to the motor 33 from an external power source with a brush contact structure just to name a few. However, electricity that can be supplied by batteries is limited, and, with the brush contact structure, there is a risk that maintenance frequency would increase due to abrasion of the brush, for example.

For the purpose of solving these problems, the differential gear mechanism 61 is used in the second embodiment, allowing the motor 33 to be attached outside the head housing 15 of the machining unit 11a (see FIG. 8). In this manner, a configuration in which the motor 33 is attached to a portion that revolves and moves is eliminated to solve the foregoing problem. Note that, except this, the second embodiment is substantially the same as the first embodiment. Therefore, the same elements are indicated by the same symbol in the drawings, and a description thereof is omitted.

As shown in FIG. 8, the servo motor 33 for rotating the eccentric rotational section 31 is fastened to the outside of the back end of the head housing 15 of the machining unit 11a. The rotation of the motor 33 is transmitted to the globoidal cam 37 in the main spindle section 21, which is located forward, through a transmission shaft 52 disposed to extend in the fore-and-aft direction through the hollow-cylinder section 24 of the main spindle section 21.

More specifically, the transmission shaft 52 is supported in the hollow-cylinder section 24 with bearings 53, 53 to rotate about the rotational axis C21 of the main spindle section 21. In addition, a spur gear 54 is fastened to the front end of the transmission shaft 52 coaxial with the transmission shaft 52, and a spur gear 55 that meshes with the spur gear 54 is supported in the cylindrical section 22 of the main spindle section 21 by a bearing 56. The spur gear 55 is provided with a globoidal cam 57 in an integrated and coaxial manner. The cam surface, which is the outer circumferential surface of the globoidal cam 57 is made to mesh with a plurality of cam followers 58 disposed on the shaft end of the globoidal cam 37 that is used in this embodiment in the same manner as the first embodiment. Therefore, when the transmission shaft 52 rotates, the rotation is transmitted to the eccentric rotational section 31 through the spur gear 54, the globoidal cam 57 attached to the spur gear 55, and the globoidal cam 37, so that the eccentric rotational section 31 rotates about the eccentric axis C31.

However, as mentioned above, the main spindle section 21 rotates about the rotational axis C21. Therefore, if the transmission shaft 52 were at a standstill during the rotation of the main spindle section 21, the spur gear 55 of the main spindle section 21 would circle the spur gear 54 of the transmission shaft 52 while meshing with the spur gear 54. Associated to this circling motion, the spur gear 55 would also spin being meshed with the spur gear 54. Then the globoidal cam 57 that are provided in an integrated manner with the spur gear 55 would also spin. As a result thereof, rotational motion would be unintentionally inputted to the globoidal cam 37, to rotate the eccentric rotational section 31.

Accordingly, in order to perform a rotational operation of the eccentric rotational section 31 independent of the rotation of the main spindle section 21, first it is necessary for the transmission shaft 52 to be rotated at the same speed (rpm) as the main spindle section 21, and cancel the effect caused by the rotation of the main spindle section 21. In other words, it is necessary that a rotational motion that is required to rotate the eccentric rotational section 31 is further applied to the transmission shaft 52 that rotates at the same speed as the main spindle section 21.

In the second embodiment, adding of the above-mentioned rotational motion is realized by connecting the driven-and-rotated shaft 33a of the servo motor 33 and the transmission shaft 52 with the so-called differential gear mechanism 61 intervening therebetween.

The differential gear mechanism 61 is also referred to as a planetary gear mechanism, which is a device that can combine two independently-inputted rotational motions into a single rotational motion to be output. As shown in FIGS. 9A and 9B, the differential gear mechanism 61 includes: the sun gear 62, the four planetary gears 63 that mesh with the sun gear 62 as well as circle the sun gear 62; a planetary carrier 64 that supports rotational shafts 63a of these four planetary gears 63 and spins according to the circling motion of the planetary gears 63; and the outer gear 65 that is rotatably supported by the planetary carrier 64 and has inner teeth 65a that mesh with the four planetary gears 63 formed on an inner circumferential surface thereof. For example, when rotational motions that are independent of each other are inputted to the sun gear 62 and the outer gear 65, these two rotational motions are combined into a single motion and outputted as a spinning motion of the planetary carrier 64.

In the second embodiment, as shown in FIGS. 9A to 9C, a rotational motion of the main spindle section 21 is inputted to the outer gear 65 by the meshing of the outer teeth 24a formed on the back end of the hollow-cylinder section 24 of the main spindle section 21 with the teeth 68a of the front end of the gear 68 rotatably supported by the head housing 15, and by the meshing of teeth 68b at the back end of the gear 68 with the outer teeth 65b of the outer gear 65. On the other hand, a shaft end of the sun gear 62 has directly connected thereto the driven-and-rotated shaft 33a of the servo motor 33 for driving and rotating the eccentric rotational section 31, and a rotational motion necessary to move the tool holder 41 in the radial direction is inputted to the sun gear 62 from the motor 33. And to the front end of the planetary carrier 64 to which a combination of these two rotational motions are outputted as a spinning motion, the back end of the transmission shaft 52 is coaxially fastened. In this manner, the transmission shaft 52 undergoes a rotational motion achieved by combining the rotational motion of the main spindle section 21 and the rotational motion of the servo motor 33. As a result thereof, during the rotation of the main spindle section 21, controlling the motor 33 to rotate the eccentric rotational section 31 allows the tool holder 41 to move in the radial direction.

For example, when the motor 33 rotates the sun gear 62, the transmission shaft 52 that rotates at the same speed as the main spindle section 21 is further rotated according to the rotation amount of the sun gear 62. Therefore, the eccentric rotational section 31 is rotated according to the rotation amount, and as a result thereof, the tool holder 41 moves in the radial direction. When the rotation of the sun gear 62 is ceased by the motor 33, the tool holder 41 stops moving in the radial direction through the ceasing of the rotation of the eccentric rotational section 31. In this case, the transmission shaft 52 is rotated at the same speed as the main spindle section 21, so that the tool holder 41 remains at a ceased state in the radial direction.

Note that, rotating the transmission shaft 52 at the same speed as the main spindle section 21 when the motor 33 is at a stopped state, that is, when the rotational motion is not inputted from the sun gear 62, is realized by properly setting the number of outer teeth 24a of the hollow-cylinder section 24 of the main spindle section 21, the number of teeth 68a at the front end of the gear 68, the number of teeth 68b at the back end of the gear 68, the number of outer teeth 65b of the outer gear 65, the number of inner teeth 65a of the outer gear 65, and the number of teeth of the planetary gears 63.

Figure 10:
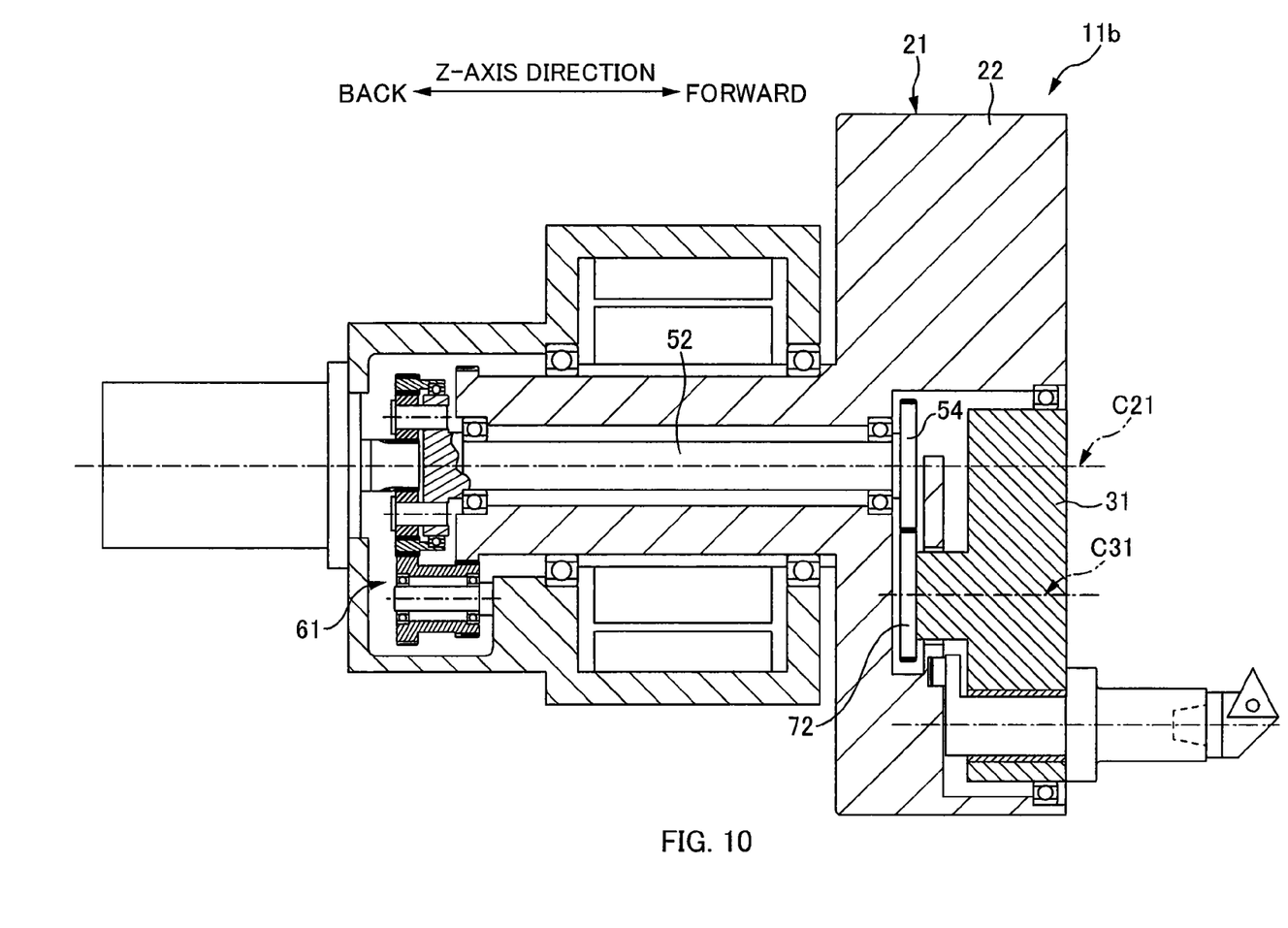
FIG. 10 is a longitudinal sectional view of a machining unit 11b according to the modified example of the second embodiment.

FIG. 10 is a longitudinal sectional view of a machining unit 11b according to a modified example of the second embodiment.

In the foregoing second embodiment, transmission of rotational motion from the transmission shaft 52 to the eccentric rotational section 31 was performed using such as the cam mechanism including the globoidal cams 37, 57. This modified example is different in that only a gear train including the spur gear 54 and a spur gear 72 is used. More specifically, the spur gear 54 is fastened to the front end of the transmission shaft 52 in a coaxial manner with the transmission shaft 52, and the spur gear 72 meshing with the spur gear 54 is fastened to the eccentric rotational section 31 in a coaxial manner with the eccentric axis C31 of the eccentric rotational section 31. By these spur gears 54, 72 meshing with each other, the rotation of the transmission shaft 52 is transmitted to the eccentric rotational section 31 to rotate the eccentric rotational section 31. As a matter of course, the modified example uses the differential gear mechanism 61 explained in the description of the second embodiment.

Other Embodiments

The embodiments of the present invention has been described above, but the present invention is not limited to the above described embodiments. The invention can be modified as follows.

Figure 11:
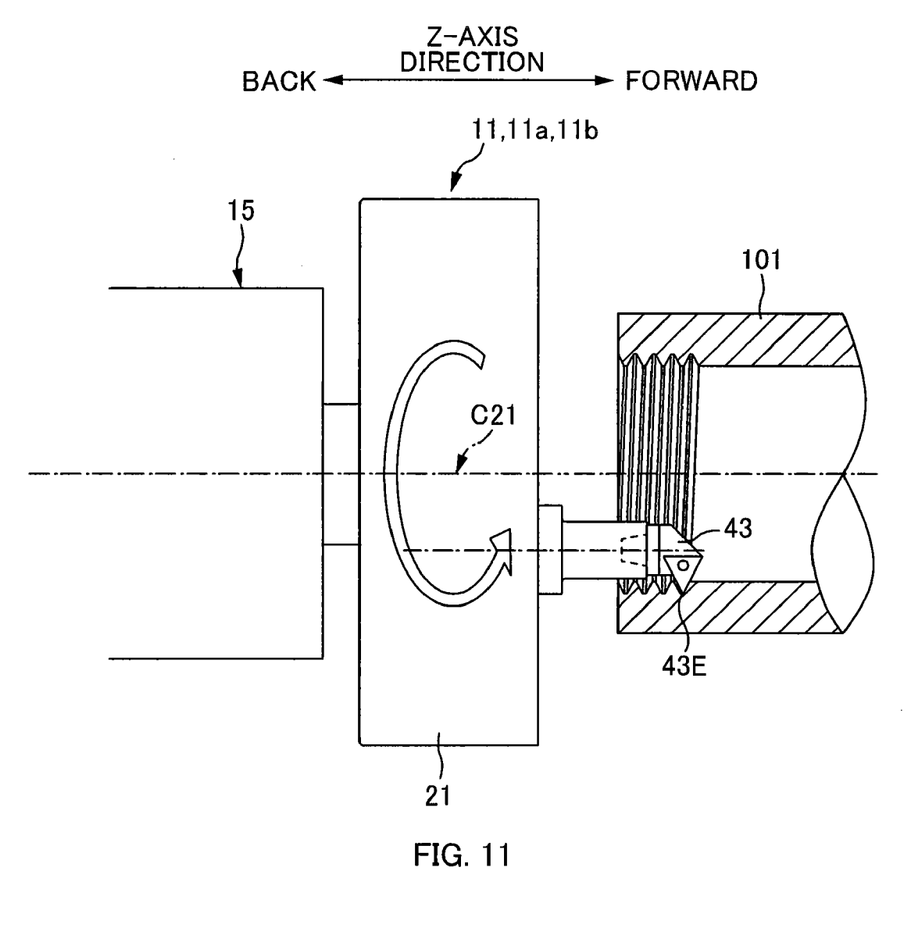
FIG. 11 is a diagram for illustrating how screw-threading is performed onto an inner circumferential surface of a pipe 101 by the machining units 11, 11a, and 11b.

(a) In the foregoing embodiments, since the case where screw-threading is performed on the outer circumferential surface of the pipe 101 was exemplified, the orientation of the cutting edge 43E of the tool 43 were corrected by the spinning of the tool holder 41 so that the cutting edge 43E faces the rotational axis C21 of the main spindle section 21. However, as a matter of course, when screw-threading is performed on the inner circumferential surface of the pipe 101, the orientation of the cutting edge 43E during machining is changed so that the cutting edge 43E of the tool 43 turns in the direction opposite to the rotational axis C21 of the main spindle section 21, as shown in FIG. 11.

Further, the foregoing describes that the cutting edge 43E is corrected so as to turn toward the rotational axis C21 of the main spindle section 21 or in the opposite direction thereto. However, as long as an intended cutting capability is ensured for various workpieces to be processed, the orientation of the cutting edge 43E may face in a direction that is slightly off the direction of the rotational axis C21 or an opposite direction thereof to some degree. In this meaning, regarding the correction of the orientation of the cutting edge by the cutting-edge-orientation correcting mechanism, it may be expressed as follows, "the orientation of the cutting edge is corrected by the cutting-edge-orientation correcting mechanism so as to face a certain range with reference to the rotation center of the main spindle section."

(b) In the foregoing embodiments, a cam mechanism including a grooved cam, etc. is used for the cutting-edge-orientation correcting mechanism, so that the orientation of the cutting edge 43E of the tool 43 is automatically corrected according to the revolution radius of the tool 43. However, the invention is not limited to such. For example, a dedicated power source such as a motor for making the tool holder 41 spin may be provided additionally to allow the tool holder 41 to be operated to spin independently of the rotational motion of the eccentric rotational section 31.

(c) In the foregoing embodiments, the type of the bearings 26, 32, 38, 44, 53, 56 has not been described. A roller bearing, a ball bearing, and a plain bearing may be used, and a crossed roller bearing may also be used.

(d) In the foregoing embodiments, screw-threading of the pipe 101 is described as one example of machining. However, the invention is not limited thereto as long as machining is performed by revolving the tool 43.

What is claimed is:

1. A machining unit that is supported on a machine tool and machines a workpiece by causing a tool to be revolved with a main spindle section being driven and rotated, comprising:

an eccentric rotational section that is disposed on the main spindle section and that is rotatable about an eccentric axis, the eccentric axis being located eccentrically at any distance in a radial direction of the main spindle section from a rotation center of the main spindle section;

a tool holder that is disposed on the eccentric rotational section and that holds the tool;

a tool revolution-radius changing mechanism that moves the tool in the radial direction of the main spindle section and changes the radius of revolution of the tool by rotating the eccentric rotational section about the eccentric axis; and a cutting-edge-orientation correcting mechanism that corrects the orientation of a cutting edge of the tool by making the tool holder spin about an axis of the tool holder, the axis being parallel to the rotation center of the main spindle section, wherein the main spindle section has a cam groove formed thereon, the tool holder is provided with an arm having a cam follower, the cam groove is engaged with the cam follower, and the orientation of the cutting edge of the tool is corrected by rotating the eccentric rotational section about the eccentric axis so as to cause the cam follower to move while being restricted by the cam groove and to cause the tool holder to spin about the axis parallel to the rotation center of the main spindle section via the arm.

2. A machining unit according to claim 1, wherein the cutting-edge-orientation correcting mechanism corrects the orientation of the cutting edge in such a manner as the orientation of the cutting edge is within a certain range with reference to the rotation center of the main spindle section.

3. A machining unit according to claim 2, wherein the orientation of the cutting edge of the tool is corrected in such a manner as the cutting edge faces the rotation center of the main spindle section or in the opposite direction thereto.

4. A machining unit according to claim 1, wherein the cutting-edge-orientation correcting mechanism changes the orientation of the cutting edge of the tool according to the radius of the revolution of the tool.

5. A machining unit according to claim 1, wherein the path of the axis of the tool holder that is moved by the rotation of the eccentric rotational section passes through the rotation center of the main spindle section.

6. A machining unit according to claim 1, wherein the machine, tool has a mechanism to move the main spindle section straight along an axial direction of the rotation center of the main spindle section;

the workpiece is a cylindrical pipe that is immovably held at a certain position; and a helical thread is formed on any of an outer circumferential surface and an inner circumferential surface of the pipe by making the cutting edge of the tool abut against the surface of the pipe and moving the main spindle section straight with the main spindle section rotating while aligning an axis of the rotation center of the main spindle section with an axis of the pipe.

7. A machine tool that machines a workpiece by causing a tool to be revolved with a main spindle section being driven and rotated, comprising:
- a mechanism to move the main spindle section straight along an axial direction of a rotation center of the main spindle section;
- an eccentric rotational section that is disposed on the main spindle section and is rotatable about an eccentric axis, the eccentric axis being located eccentrically at any distance in a radial direction of the main spindle section from the rotation center of the main spindle section;
- a tool holder that is disposed on the eccentric rotational section and that holds the tool;
- a tool revolution-radius changing mechanism that moves the tool in the radial direction of the main, spindle section and changes the radius of revolution of the tool by rotating the eccentric rotational section about the eccentric axis; and
- a cutting-edge-orientation correcting mechanism that corrects the orientation of a cutting edge of the tool by making the tool holder spin about an axis of the tool holder, the axis being parallel to the rotation center of the main spindle section, wherein the main spindle section has a cam groove formed thereon, the tool holder is provided with an arm having a cam follower, the cam groove is engaged with the cam follower, and the orientation of the cutting edge of the tool is corrected by rotating the eccentric rotational section about the eccentric axis so as to cause the cam follower to move while being restricted by the cam groove and to cause the tool holder to spin about the axis parallel to the rotation center of the main spindle section via the arm.

* * * * *